United States Patent [19]

Natori et al.

[11] Patent Number: 4,776,915

[45] Date of Patent: Oct. 11, 1988

[54] METHOD OF PREPARING MOLDING FOR VEHICLE

[75] Inventors: Sadaaki Natori, Toyota; Nobutoshi Hase, Nishio, both of Japan

[73] Assignees: Toyota Jidosha Kabushiki, Toyota; Aisin Seiki Kabushiki Kaisha, Kariya, both of Japan

[21] Appl. No.: 45,758

[22] Filed: Apr. 28, 1987

Related U.S. Application Data

[63] Continuation of Ser. No. 757,872, Jul. 23, 1985, abandoned.

[30] Foreign Application Priority Data

Jul. 23, 1984 [JP] Japan ................................ 59-152510

[51] Int. Cl.4 ...................... B32B 31/12; B32B 31/28; B29C 35/12
[52] U.S. Cl. ................................. 156/274.8; 156/245; 156/293; 156/272.4; 264/26
[58] Field of Search ...................... 156/245, 293, 272.4, 156/274.8, 380.3, 228, 303.1

[56] References Cited

U.S. PATENT DOCUMENTS 3,107,190 10/1963 Kevelin ............................ 156/274.4
3,437,541 4/1969 Cooper et al. ...................... 156/245

FOREIGN PATENT DOCUMENTS 55-74275 6/1980 Japan .................................. 156/293

Primary Examiner—Jan H. Silbaugh
Assistant Examiner—Yun H. Wang
Attorney, Agent, or Firm—Oblon, Fisher, Spivak, McClelland & Maier

[57] ABSTRACT

A method of preparing a molding for vehicle, on the surface or in the body of which a metal member to be bonded to the product is integrally bonded or held, wherein the material to be molded into a desired shape and the metal member to be bonded to the molding are placed in a mold and heated by dielectric heating and the like, so as to integrally mold the same together.

5 Claims, 4 Drawing Sheets

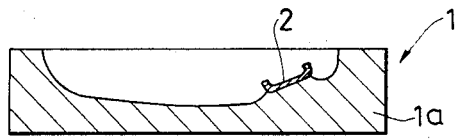
FIG. 1
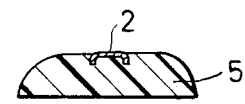
FIG. 5a
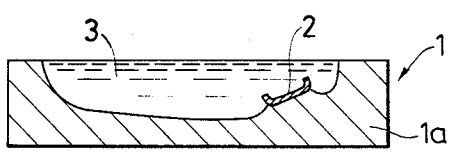
FIG. 2
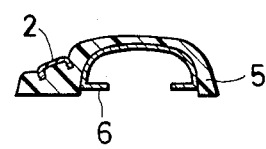
FIG. 5b
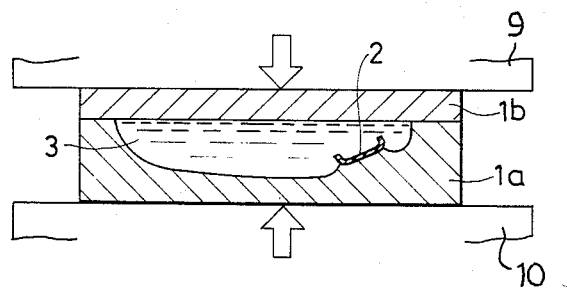
FIG. 3
FIG. 5c
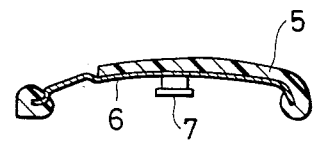
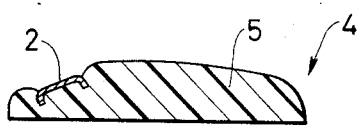
FIG. 4
FIG. 5d
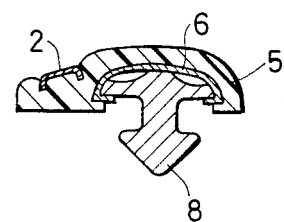

METHOD OF PREPARING MOLDING FOR VEHICLE

This application is a continuation of application Ser. No. 757,872 filed on July 23, 1985, now abandoned.

BACKGROUND OF THE INVENTION

1. Field of the Invention

This invention relates to a method of preparing molding for a vehicle and making use of mold.

2. Description of the Prior Art

Moldings for a vehicle, being integrally bonded with a metal member, such as stainless steel plate, on the surface of plastic body, have been known.

As a method of preparing this kind of molding for a vehicle, there is known extrusion molding or injection molding. However, since the former is an extruding method, in which plastc and a metal plate are integrally and continuously extruded from an extruder die, the molded product extruded from the mold has constant dimensions in its thickness and width along with its extruded direction. Therefore, a molded product having no constant thickness in the extruding direction, for example, having a tapered surfaces to the extruding direction is very difficult to mold.

Further, in the latter method, different from the former method, it is possible to obtain a desired shape of molding, however, there are some drawbacks that, in case of setting in advance a member to be bonded to a molded member in a mold before injecting a molten plastic, the member set in the mold is apt to be dislocated by the injection pressure of molten plastic, so that the member is not bonded to the molded member properly in its position, or satisfactory bonding strength of the member to the molded product can not be obtained depending upon the temperature of molten plastic.

SUMMARY OF THE INVENTION

One object of this invention is to provide a method of preparing a molding for vehicle, on the surface or in the body of which a member, such as a stainless steel plate, to be bonded to the product is integrally bonded or held.

Another object of this invention is to provide a method of preparing a molding having a desired shape integrally formed with a member to be bonded.

Another object of this invention is to provide a method of preparing a molding, to which a member to be bonded is integrally bonded.

Still further object of this invention is to provide a method of preparing a molding, in which a desired member to be bonded is bonded to the molding with sufficient bonding strength.

A still further object of this invention is to provide a molding formed in a desired shape having a member to be bonded being bonded integrally.

In order to obtain a molding bonded integrally with a metal member to be bonded, the method according to this invention is characterised by the steps of putting a material to be molded into a desired shape and a metal member to be bonded to the afore-mentioned molding in a mold, and heating them in the mold by dielectric heating and the like, so as to integrally mold them.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 through FIG. 3 show an embodiment of the process according to this invention.

FIG. 4 is a cross sectional view of a molding obtained according to the above process of this invention.

FIGS. 5a, 5b, 5c and 5d show modified embodiments of the molding according to this invention.

DETAILED DESCRIPTION OF THE INVENTION

Figure 6:
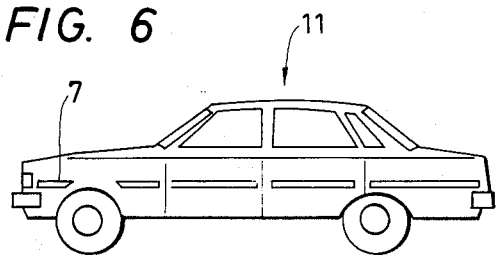
FIG. 6 is a side view showing the position of a molding to be bonded on vehicle.

The method of this invention is conducted in such a manner that after putting material and members to be bonded in a mold, they are heated by a certain means. As this heating means, it is conceivable to put the whole mold as it contains material and members, in a heating furnace, but from the workability point of view, it is preferable to make use of dielectric heating with a high frequency.

Accordingly, as a material for the molding, plastic resins which are generally used for such a molding can be used, however it is preferable to use those which easily generate heat under dielectric heating.

The quantity of heat Pv generated under dielectric heating is given by the following formula:

$$Pv = K \cdot f \cdot E^2 \cdot \epsilon \cdot \tan\delta$$

wherein,
K: constant
f: frequency (for example 27.12 MHz)
E: electric intensity (voltage)
$\epsilon$: dielectric constant
$\tan\delta$: dielectric power factor In the above formula, since on the one hand the values of $\epsilon$ and $\tan\delta$ are determined by the material used and on the other hand the values of $\epsilon$ slightly differ in case of plastic resins, it is preferable to use a material having a large value of $\tan\delta$. As the plastic resins having large value of $\tan\delta$ and usable in this method of this invention, are for example, polyvinyl chloride (soft or hard), polyvinylidene chloride, nylon (polyamide), polyurethane and the like. Above all, polyvinyl chloride is most preferable from the viewpoint of its good high frequency property, low cost and other appropriate physical property.

These resins may be used in the form of powder, granules, pellets or plastisol, which are usually used for molding and further they may be used in a form of molded product formed in advance in desired shapes. These desired shapes may be almost indentical with the ones desired or may be separated in 2 or more pieces of the desired shapes.

In the case of molding for vehicle, normally transparent resins are used as the material but it is not necessarily restricted to this kind of material and some conventional additives, such as colorants, reinforcement materials or ultraviolet and oxidation deterioration inhibitors, which are used normally in molding of resins, may be blended.

Further, as a member to be bonded according to this invention, particularly in the case of a molding for vehicle, a foil or a thin metal plate having brightness such as stainless steel or aluminum is used. However it is not restricted to such kind of metal plate but may be other shapes and materials. In case of a member to be bonded to the back surface of the molding, such as a core metal, a normal steel plate may be used.

These members to be bonded are used as it is or after pre-treatment such as degreasing or pickling if necessary. Further, if necessary, it may be coated with a coating material for increasing bonding force and/or chemical resistance on its surface or the surface of it may be coarsened by sanding. As this coating material, a primer such as wash primer which is used in normal metal coating may be used, but preferably a heat active bonding agent is recommended. As examples of coating material, vinyl chloride-vinyl acetate copolymer, acrylic resin, ionomer resin or terpolymers such as vinyl chloride-vinyl acetate-phthalic acid terpolymer may be used.

As a mold to be used in this invention, a metal mold may be used, but so as to make the heating of the materials set in the mold effective, it is preferable to use a mold made of a material having a low dielectric loss factor and a high heat resistance. For example, fluoroplastics (for instance Teflon), epoxide resin, silicone resin or ceramics etc. are mentioned. However, above all, from the viewpoint of processibility, easy-handling and release characteristic, a mold made of silicone rubber is most preferable.

When the heating is conducted under dielectric heating with a high frequency, the mold in which the material and members to be bonded are placed at a given position is located between a pair of electrodes and molding process is carried out. In case that the aforementioned material is molding material such as powder etc., heating is continued until it is melted, on the other hand in case such it is molded member, it may be heated at a temperature to the extent that the member to be bonded is firmly bonded to the molded member.

Dielectric heating is conducted in a conventional manner.

Hereinafter, embodiments of the present invention will be described by way of examples and with reference to the accompanying drawings but the invention is not limited by these embodiments.

EXAMPLE 1

As shown in FIG. 1, a bright member 2 made of a stainless steel plate (SUS 430MT, 0.5 mm in thickness) as a member to be bonded is put at the pred-determined position in the lower mold 1a of a mold 1, thereafter, as shown in FIG. 2, plastisol of polyvinyl chloride as the material is poured into the lower mold 1a. Then, as show in FIG. 3, the upper mold 1b is joined and tightened with the lower mold 1a, and the mold 1 is held by the electrodes 9 and 10 on the top and the bottom thereof and the material 3 is melted by dielectric heating. After a predetermined duration of heating, the current is stopped and the mold 1 is cooled, then the upper mold 1b is removed and the molded product with a bright member being bonded thereto is taken out from the lower mold 1a. The molding temperature is pre-set to the extent that the plastic resin as the material is formed into the desired shape in the mold and the material 3 and the bright member as a member to be bonded are firmly bonded. In the case of coating a thermosetting or heat active bonding agent on the member to be bonded so as to increase bonding force, heating is conducted at a temperature until the bonding agent is activated.

In this embodiment, the mold made of silicone rubber was used and the heating temperature is about 100° to 150° C. The heating duration under dielectric heating may be different depending upon the dimensions of the mold and the mold product, but in this embodiment, the heating time was about 30 seconds and the cooling time was about 90 seconds.

FIG. 4 shows a molding thus obtained, i.e. molding 4, and numeral 5 designates the part of plastic molded.

It is possible to mold molds in the shapes illustrated in FIGS. 5a, 5b, 5c and 5d in addition to the shape illustrated in FIG. 4. In these FIGS., numeral 6 designates a core metal bonded to the assembling surface of the molding 4, numeral 7 designates a T-letter shaped stud and 8 designates a clip. Particularly, in the embodiment illustrated in FIG. 5c, a part of the metal core is exposed from the molded member 5 and in the embodiment 5d, it is shown that the molded member as a molding has been molded by the process in which the plastic was melted and hardened after a core metal 6 with a clip 8 set in advance had been put in the mold.

EXAMPLE 2

This embodiment illustrates a molded member of soft polyvinyl chloride (hardness 90 degrees) using the material 3.

Figure 7:
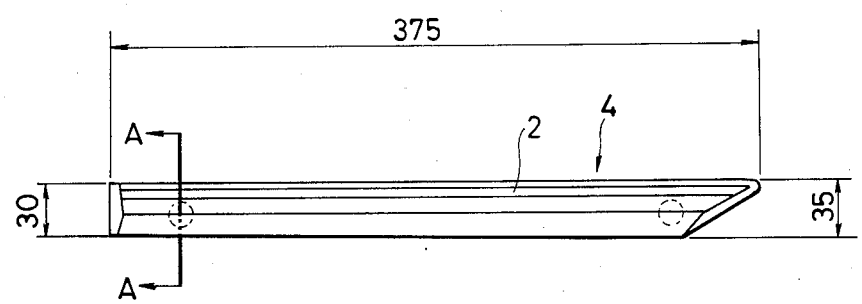
FIG. 7 is a front view of an embodiment of the molding according to this invention.

FIG. 6 shows a side view of the position where a molding 4 is assembled. The molding 4 to be provided on such a position 7 as illustrated of a vehicle 11, is designed, as shown in FIG. 7, so as to increase its width to the backward direction of the body of the vehicle, in the figure toward the right direction. That is, the molding 4 is 30 mm in the width at its left end and 35 mm at its right end. In molding 4, the bright member 2 to be bonded on the molded member, as a member to be bonded, is a stainless steel plate (SUS 430MT) of 6 mm constant in its width in the longitudinal direction and 0.4 mm in thickness.

Figure 9:
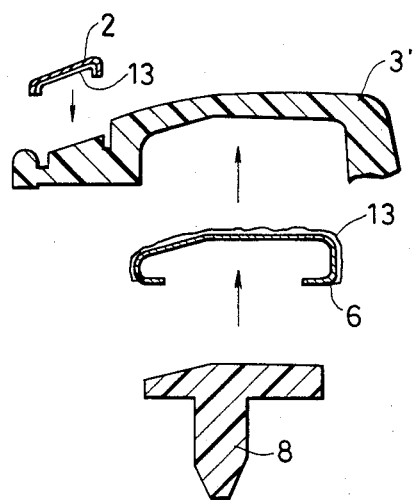
FIG. 9 is an exploded sectional view of a molding, showing assembling manner of parts of the molding.
Figure 12:
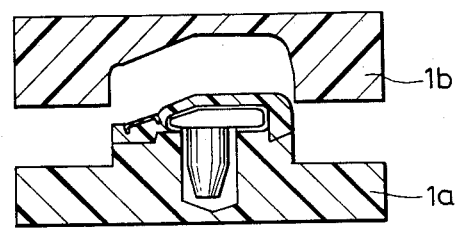
FIG. 12 is a cross sectional view of a mold in which a molding is set.

In this embodiment, as shown in FIG. 9, the bright member 2 as a member to be bonded, the core 6, the molded member 3' (i.e., the material) and the clip 8 made of resin have been shaped separately, assembled together as shown in and then placed in the mold (1a, 1b) as shown in FIG. 12 and heated. Incidentally, the core 6 is made of a stainless steel plate (SUS 430E) of 0.4 mm in thickness and the clip 8 is made of polyacetal. In addition, a heat active bonding agent 13 was coated on the bonding portions of the bright member 2 and the core 6.

Figure 10:
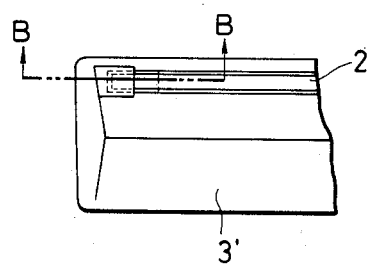
FIG. 10 is a front end view of a bright member (a member to be bonded) of a molding, showing assembling manner.
Figure 11:
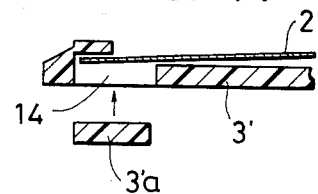
FIG. 11 is a cross section of the molding taken by line B—B in FIG. 10.

FIGS. 10 and 11 show how to fix the bright member 2 on the molded member. Since the bright member 2 is disposed on the surface of the molded member 3', so as to avoid displacement of the bright member 2, this member is assembled and molded in such a manner that the molded member 3' is provided with two openings 14 at both end portions into which end portions of the bright member 2 are inserted as shown in FIG. 11 and these openings are thereafter filled with molded members 3'a.

Figure 13:
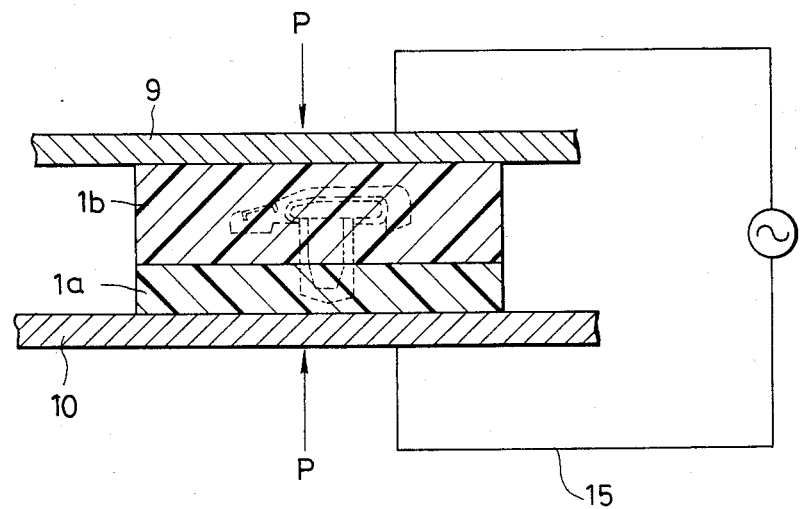
FIG. 13 is a cross sectional view of a mold under dielectric heating.

A molding material, which has been assembled with the necessary parts, is put in the mold as shown in FIG. 12, and as shown in FIG. 13 the mold 1 is held by electrodes 9 and 10 made of steel and the like at the top and the bottom and a high frequency current is applied to the electrode for heating the mold 1. Numeral 15 designates a lead.

Figure 8:
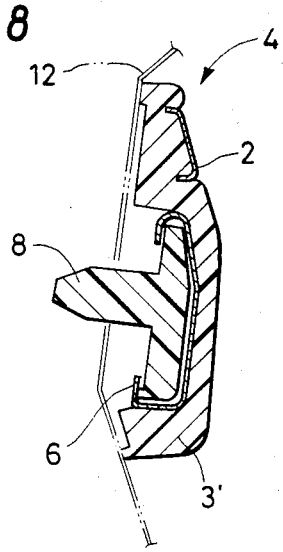
FIG. 8 is a cross section of the molding taken by line A—A in FIG. 7.

The heating duration time was about 30 seconds and the cooling duration time was about 90 seconds. The molding thus obtained is to be installed to a vehicle by inserting the clip 8 into a hole provided on an outer panel 12 as shown in FIG. 8, and being fixed.

As apparent from the above explanation, according to this invention, when preparing a molding, different from a conventional method of injection molding in which the injection pressure may displace the members to be bonded, the members to be bonded which have been placed in the mold can be heated as is without being moved, so that the member to be bonded is never displaced from the predetermined position.

Further, according to this invention, since the method allows the materials to be filled in advance and then the molding process to be conducted, the desired shapes of the molded member are obtained. Accordingly, compared to the conventional extrusion molded product, thicker products having a thickness of as 5 to 10 mm can be molded.

Further, according to this invention, the single material in the mold or both the material and the member to be bonded in the mold can be heated by dielectric heating, and furthermore, the bonding agent coated on the member to be bonded can be heated at a higher temperature than the other materials, so that a stronger bonding force can be obtained. In order to promote the heat generation of the material themselves, some fillers which are effective for heat generation may be added to the materials or the bonding agents.

Obviously, numerous modifications and variations of the present invention are possible in light of the above teachings. It is therefore to be understood that within the scope of the appended claims, the invention may be practiced otherwise than as specifically described herein.

What is claimed is:

1. A method of preparing a molding integrally bonded with a U-shaped metal member, which comprises the steps of:
   preparing a premolded resin material main member having a groove portion formed so as to be open to one side thereof and having first and second hole portions respectively formed at both ends of said groove so as to be open to the other side thereof;
   assembling said metal member in said groove portion of said main member in a state wherein ends of said metal member are respectively inserted into said first and second hole portions of said main member and placing premolded resin material end members respectively in said first and second hole portions;
   placing said main member, said metal member and said premolded resin material end members into a mold after said assembling step; and
   heating at least said main member by dielectric heating in said mold so as to bond together said main member, said metal member and said end members.

2. A method of preparing a molding according to claim 1, wherein said dielectric heating further comprises dielectric heating with a high frequency.

3. A method of preparing a molding according to claim 1, wherein the resin material of the main member is selected from the group consisting of polyvinyl chloride, polyvinylidene chloride, nylon and polyurethane.

4. A method of preparing a molding according to claim 1, wherein the metal of the metal member is selected from the group consisting of stainless steel, steel or aluminum.

5. A method of preparing a molding according to claim 4, which further comprises coating a heat active bonding agent on at least a surface of the metal member.

* * * * *